(12) United States Patent
Hirano et al.

(10) Patent No.: US 6,425,276 B1
(45) Date of Patent: Jul. 30, 2002

(54) WATER JET PEENING APPARATUS

(75) Inventors: Katsuhiko Hirano; Kunio Enomoto; Eisaku Hayashi, all of Hitachi; Sadato Shimizu, Hitachinaka; Ren Morinaka, Takahagi; Tetsuya Ishikawa, Hitachi; Shigeru Tanaka; Noboru Chiba, both of Tokai-mura, all of (JP)

(73) Assignees: Hitachi, Ltd., Tokyo; Hitachi Kiso Co., Ltd., Ibaraki; Hitachi Ibaraki Business Engineering Co., Ltd., Ibaraki; Hitachi Engineering Co., Ltd., Ibaraki, all of (JP)

( * ) Notice: Subject to any disclaimer, the term of this patent is extended or adjusted under 35 U.S.C. 154(b) by 0 days.

(21) Appl. No.: 09/489,026

(22) Filed: Jan. 21, 2000

(30) Foreign Application Priority Data

Jan. 26, 1999 (JP) .............................. 11-017423

(51) Int. Cl.$^7$ .............................. B24C 1/00; B08B 3/02; G21C 17/00
(52) U.S. Cl. .............................. 72/53; 134/10; 134/30; 376/249; 376/260; 451/39; 451/40
(58) Field of Search ........................ 72/53, 54; 134/10, 134/30, 31, 34, 37; 376/245, 248, 249, 260; 451/39, 40

(56) References Cited

U.S. PATENT DOCUMENTS

| | | | | |
|---|---|---|---|---|
| 5,305,361 A | * | 4/1994 | Enomoto et al. | 376/316 |
| 5,778,713 A | * | 7/1998 | Butler et al. | 72/53 |
| 5,849,099 A | * | 12/1998 | McGuire | 134/10 |
| 6,058,153 A | * | 5/2000 | Kurosawa et al. | 376/249 |
| 6,240,155 B1 | * | 5/2001 | Kurosawa et al. | 376/305 |

FOREIGN PATENT DOCUMENTS

| | | |
|---|---|---|
| JP | 4-362124 | 12/1992 |
| JP | 7-270590 | 10/1995 |

* cited by examiner

Primary Examiner—David Jones
(74) Attorney, Agent, or Firm—Mattingly, Stanger & Malur, P.C.

(57) ABSTRACT

A water jet peening apparatus which can carry out an efficient peening work on a large-diameter cylindrical structure by injecting a jet stream which contains air bubbles caused by cavitation at a low angle of incidence is provided. The apparatus is comprised of a nozzle which introduces a high pressure water and injects a water jet stream containing air bubbles caused by cavitation at the cylindrical structure disposed in water, wherein the angle of injection of the jet stream is smaller than 45 degrees relative to a tangent of the cylindrical structure.

21 Claims, 14 Drawing Sheets

FIG. 1A   FIG. 1B
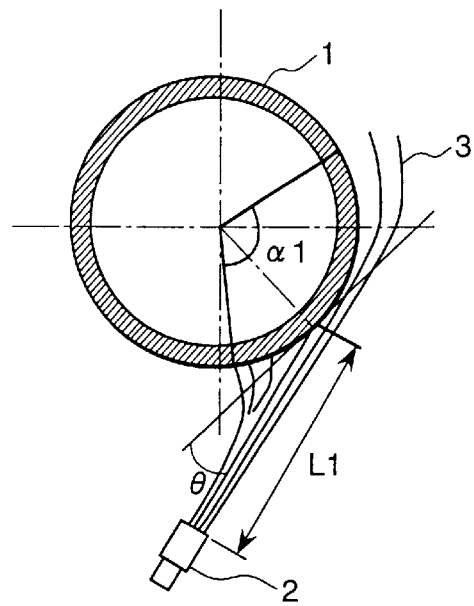
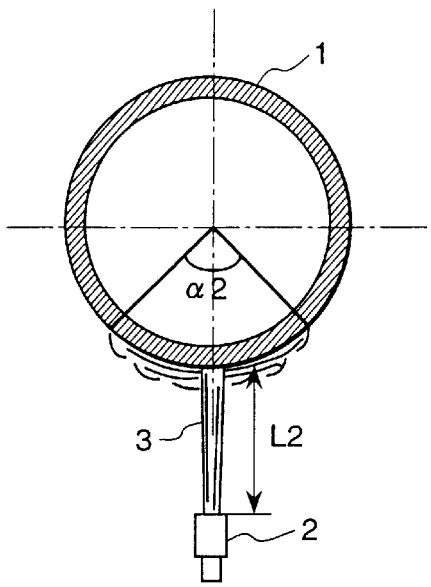
FIG. 2
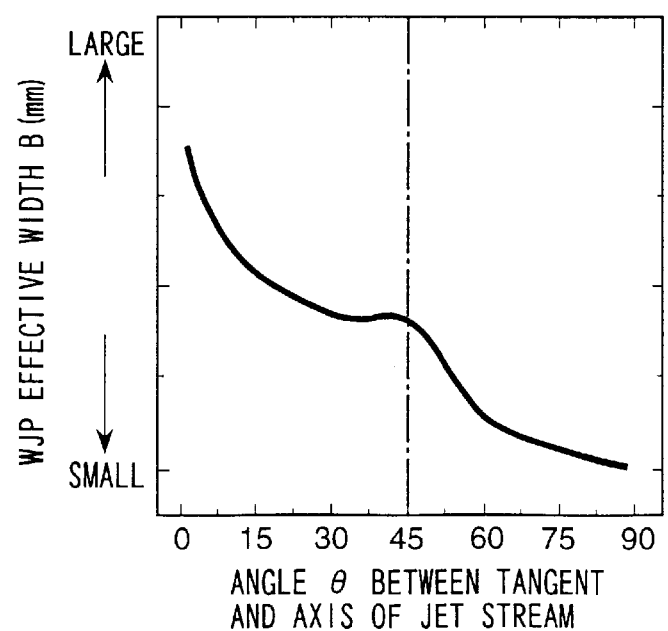

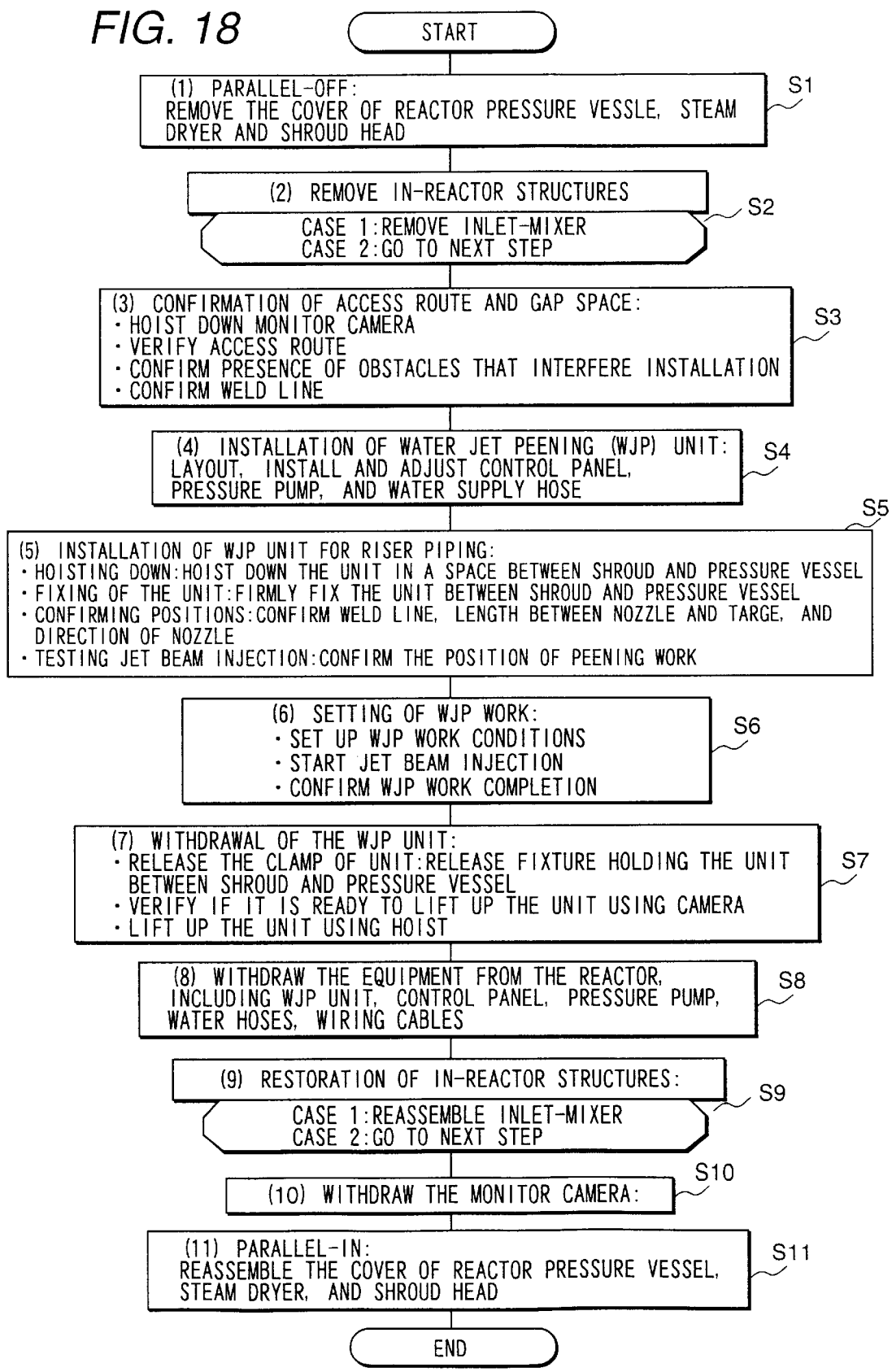

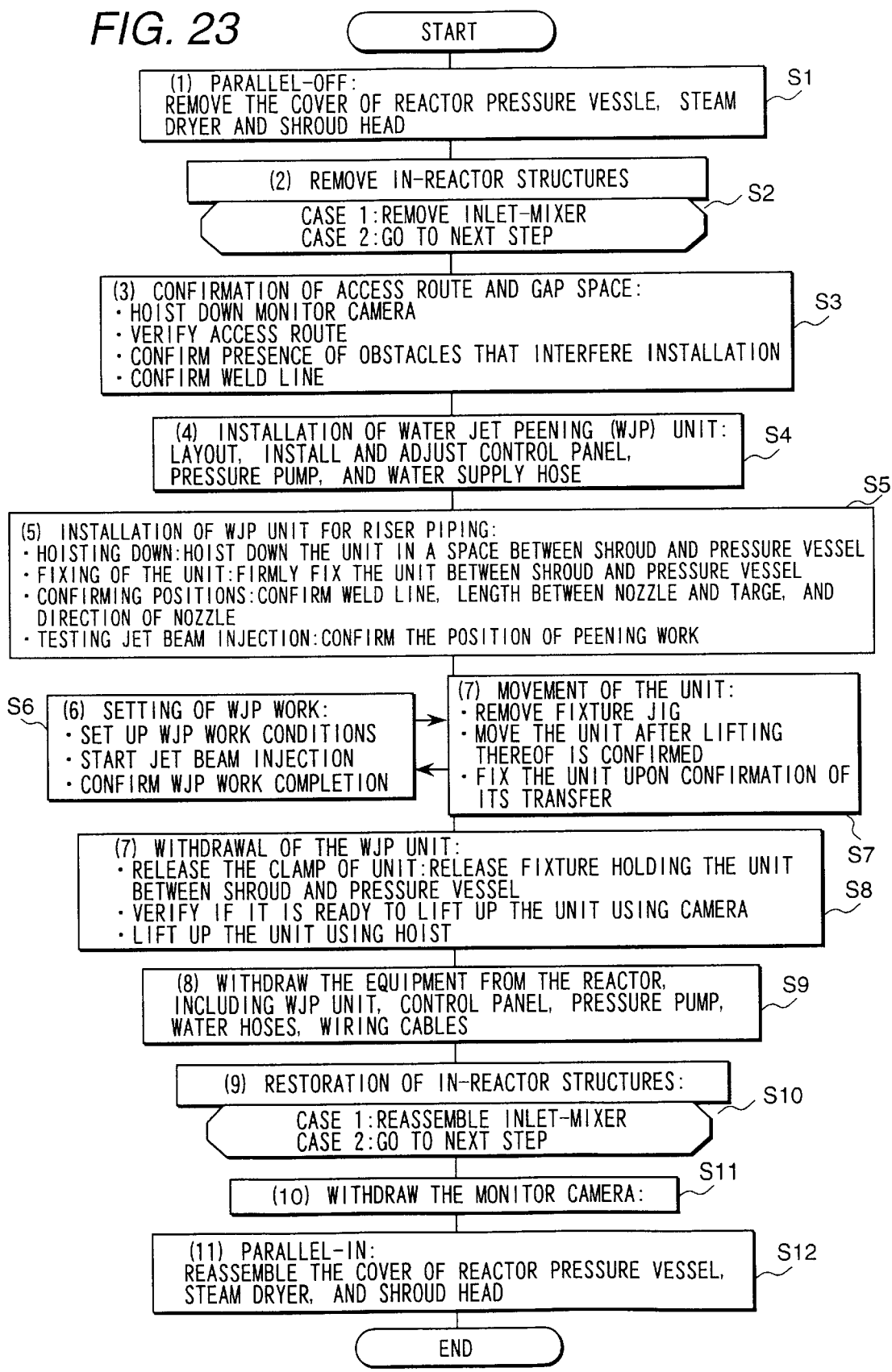

WATER JET PEENING APPARATUS

BACKGROUND OF THE INVENTION

The present invention relates to a water jet peening apparatus and, in particular, to a water jet peening apparatus suitable for reducing a residual stress in an outer surface of a large-diameter cylindrical structure disposed in a narrow gap space.

In a narrow gap space between a nuclear reactor pressure vessel and its shroud wall in a power generation plant, there are installed various large-diameter cylindrical structures such as a jet pump riser piping, jet pump diffuser and the like that have weldments. In these weldments and also in a part of the structure subjected to thermal stress during welding, there exists a residual tensile stress, which tends to cause a stress corrosion crack afterward. Therefore, there is necessity to relieve such tensile stress or to modify residual tensile stress into a residual compression stress in order to prevent the occurrence of stress corrosion cracking.

A water jet peening method is known as a means for providing a residual compression stress. For example, JPA Laid-Open No. 4-362124 discloses a water jet peening method wherein a water jet is injected from a jet nozzle disposed opposite to a plate metal material placed in a fluid at the plate metal such that a jet beam containing air bubbles caused by cavitation impinges on the surface of the plate metal. Cavitation air bubbles collapse upon collision of the jet beam, thereby causing water hammering to strike the surface of the plate metal, and thereby providing a compression residual stress in a surface layer thereof.

Further, JPA Laid-Open No. 7-270590 discloses a method of applying a wide-range peening on the surface of a cylindrical structure by causing the water jet to collide on an eccentric position relative to the cylindrical structure.

The above-mentioned prior art method for peening the cylindrical structure by impinging the jet water beam on the surface of the cylindrical structure at the eccentric position thereof is designed to be applied to a group of piping provided in a reactor each having a relatively small diameter of about 100 mm.

On the other hand, inside the reactor pressure vessel, there are installed various types of piping such as a jet pump riser piping that has a diameter of approximately 300 mm, a jet pump diffuser that has a diameter of approximately 500 mm and the like. As for these large-diameter piping, when the jet water beam is impinged from a frontal direction, a side face jet flow cannot be expected to occur in a wide range alike in the case of peening of the flat plate. Therefore, a wide range peening effect cannot be achieved.

Further, the jet pump riser and the jet pump diffuser are located in an annulus section in a gap space between the reactor vessel and the shroud. Because they are located in the narrow gap space, it has been difficult to ensure for an appropriate injection distance and an appropriate angle of incidence of the jet to be achieved.

SUMMARY OF THE INVENTION

An object of the invention is to provide for a water jet peening apparatus which is capable of applying an efficient peening work on an external surface of a large-diameter piping for which the effect of the side face flow of the water jet could not have been applied heretofore, and at the same time, which can be installed and operated even in a narrow gap space while ensuring an appropriate injection length and angle of incidence to be achieved.

More specifically, the water jet peening apparatus according to the invention is comprised of a jet nozzle which is supplied with a pressurized fluid and generates a water jet beam in a fluid, which water jet beam contains air bubbles generated by cavitation, wherein the air-bubble containing water jet beam is impinged on a large-diameter cylindrical structure positioned in the fluid for peening of the surface of the large cylindrical structure, and wherein a direction of injection of the water jet beam is at an angle of 45 degrees or smaller relative to a tangential line of the cylindrical structure.

More preferably, the tangential angle is 15 degrees or less.

Further, an outside diameter of the cylindrical structure is preferably larger than 100 mm.

Still further, more preferably, the outside diameter of the cylindrical structure is larger than 200 mm.

Further, a ratio of a length of injection between the nozzle and the cylindrical structure relative to a diameter of the nozzle is preferably 75 to 150.

Still further, preferably, the nozzle is pivotally mounted on a mount base, which has a fixing device to fix its position.

Still more, preferably, the mount base is provided with a plurality of nozzles each having a different direction of injection.

Furthermore, preferably, the fixing device has a nozzle position detection device for sensing and calculating a position of the nozzle from a structure in the rear of the nozzle.

Still further, preferably, the nozzle has a swivel mechanism.

BRIEF DESCRIPTION OF THE DRAWINGS

The other objects, features and advantages of the invention will become apparent taken in conjunction with the accompanying drawings, in which:

FIGS. 1A and 1B indicate schematic arrangement of a water jet peening apparatus according to one embodiment of the invention;

FIG. 2 shows a result of peening operation of the water jet peening apparatus of the invention when an angle of injection of the water jet is varied;

FIG. 18 is a flowchart indicative of sequential process steps when applying the water jet peening apparatus of the invention to the jet pump riser piping;

FIG. 23 is a flowchart indicative of sequential steps for applying the water jet peening apparatus of the invention to a jet pump diffuser.

PREFERRED EMBODIMENTS OF THE INVENTION

Figure 3:
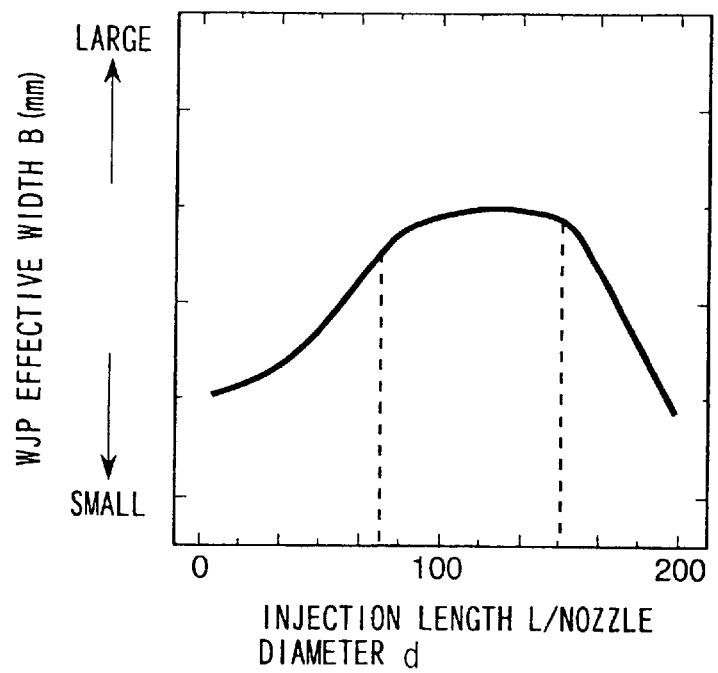
FIG. 3 shows a result of peening operation of the water jet peening apparatus of the invention when a ratio between a length of injection and a diameter of the nozzle is varied.

A first embodiment according to the invention will be described in detail with reference to FIGS. 1 to 3 in the following.

FIGS. 1A and 1B show schematic arrangements of a water jet peening apparatus according to one preferred embodiment of the invention. FIG. 2 shows a result of peening operation by the water jet peening apparatus obtained when the angle of injection of its water jet is varied. FIG. 3 shows a result of peening operation by the water jet peening apparatus obtained when the ratio between the length of injection and the nozzle diameter is varied.

In the schematic arrangements of the water jet peening apparatus of the invention indicated in FIGS. 1A and 1B, FIG. 1A indicates a case wherein a water jet beam is injected at a low angle θ relative to a tangent of a cylindrical structure, while FIG. 1B indicates a case wherein a water jet beam is injected at a high angle (perpendicular) relative to a tangent of the cylindrical structure. In these figures, reference number 1 depicts a cylindrical structure, 2 depicts a nozzle for injecting a high pressure water, and 3 depicts a water jet beam injected from the nozzle, which jet beam contains air bubbles generated by cavitation.

As shown in FIG. 1A, cylindrical structure 1 and nozzle 2 are disposed opposite from each other in water. Further, nozzle 2 is positioned to provide for an angle of injection θ of a nozzle jet flow relative to a tangent of the cylindrical structure at which the water jet impinges, and at a distance L1 of injection, that is, a distance from the center of a nozzle end to the cylindrical structure, then, a high pressure water jet beam is injected from nozzle 2 into water.

When a high pressure water is injected from nozzle 2 into water, cavitation occurs due to shearing by the water jet beam with water in the surrounding thereof, thereby causing the water jet beam in water to contain air bubbles. The water jet beam, which contains air bubbles, is caused to flow along a side surface of cylindrical structure 1 toward the rear side thereof. In the rear side of the cylindrical structure where the water jet beam reaches as a side surface flow, generation and collapse of cavitation bubbles take place actively, thereby expanding an effective range of its water jet peening work, wherein its effective range is indicated by a center angle α 1 relative to the center of the cylindrical structure.

On the other hand, FIG. 1B indicate an arrangement wherein a water jet is injected in a perpendicular direction from the nozzle which is positioned such that an angle of injection becomes 90 degrees relative to a tangent of the cylindrical structure at which the water jet impinges, without changing a distance between the cylindrical structure 1 and the nozzle 2. In FIG. 1B, a distance from the center of injection of nozzle 2 to the cylindrical structure is indicated by L2. It is clearly understood from these figures that L1>L2. Further, its effective range of water jet peening work is indicated by center angle α 2 of the cylindrical structure. This effective range is comparable to those obtained with a flat plate having no curvature-because of the large diameter of the cylindrical structure, and there exists a relationship between the effective ranges of FIGS. 1A and 1B that α1>α2.

FIG. 2 indicates a result of water jet peening operations obtained by varying the angle of injection of the nozzle relative to the tangent of the cylindrical structure. It is clearly understood from this figure that the smaller the angle θ becomes which is angle between the tangent and the center axis of water jet injection, the wider the effective range is obtained. As a result, the angle θ between the tangent and the center axis of the water jet injection is preferably smaller than 45degrees, and more preferably, smaller than 15 degrees.

FIG. 3 is a diagram indicative of a relationship between an effective width of water jet peening in circumferential direction of the cylindrical structure and a value of L/d, where L is a length of injection to a point of impingement and d is a diameter of the nozzle. It is known from this figure that in a range of values of L/d from 75 to 150, a higher and wider effective width is achieved.

Now, with reference to FIGS. 4A–4C, a relationship between an outside diameter of the cylindrical structure subject to water jet peening and an effective range thereof in which improvement of its residual stress is achievable will be described in the following.

Figure 4A:
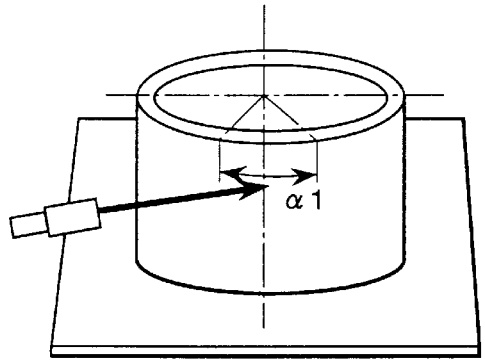
FIGS. 4A, 4B and 4C show a relationship between a cylindrical structure and a jet flow injected from the nozzle.
Figure 4B:
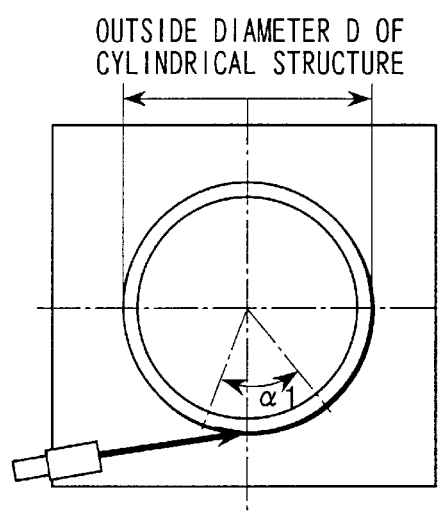
Figure 4C:
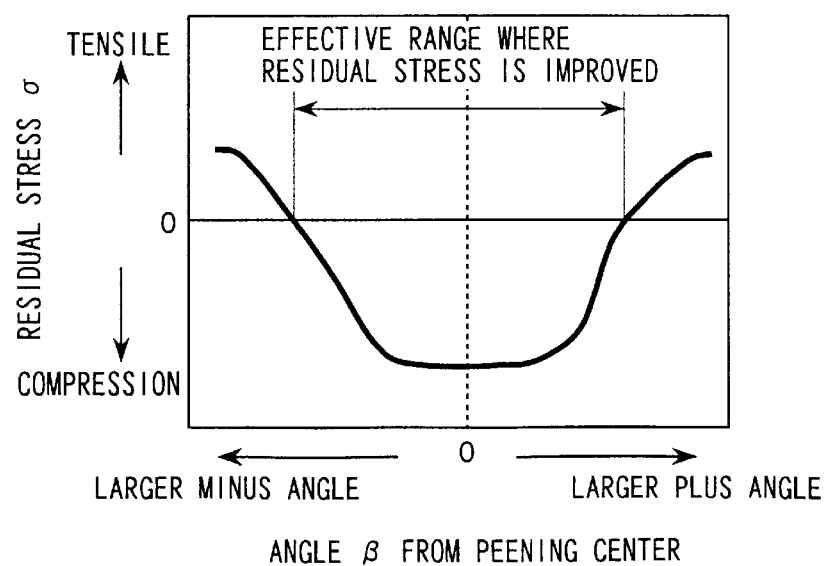

FIGS. 4A–4C indicate a relation between cylindrical structure 1 and a water jet injected from nozzle 2, where FIG. 4A is a perspective view, FIG. 4B is a plan view and FIG. 4C is a diagram indicating an effective range wherein its tensile stress is improved to a compression stress.

As indicated, a water jet injected from the nozzle impinges on an external surface of the cylindrical structure subject to water jet peening at a slant angle and diverges into an upperstream side flow and a downstream side flow at the center of water jet peening thereby expanding its effective range of water jet peening area. Its effective area is indicated by α1. This effective area varies depending on a diameter of the cylindrical structure. Therefore, a relationship between the outside diameter of the cylindrical structure and its effective area α1 in which residual stress is to be improved is obtained.

Figure 5:
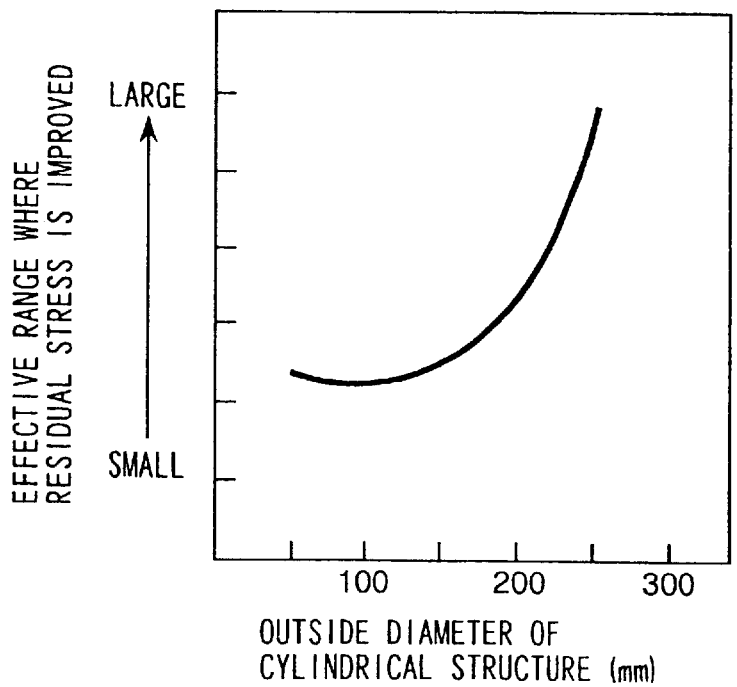
FIG. 5 indicates a relationship between an outside diameter of the cylindrical structure and an effective range according to the invention.

FIG. 5 indicates a relation of the effective area relative to the outside diameter of the cylindrical structure. As clearly indicated, there is a large difference almost two times as large in their effective areas α1 between cylindrical structures one having an outside diameter smaller than 100 mm and another one having an outside diameter larger than 250 mm. As a result, the outside diameter of the cylindrical structure subject to the water jet peening of the invention is preferably larger than 100 mm, and more preferably, larger than 200 mm.

Now, a second embodiment of the invention will be described with reference to FIGS. 6–9.

Figure 6:
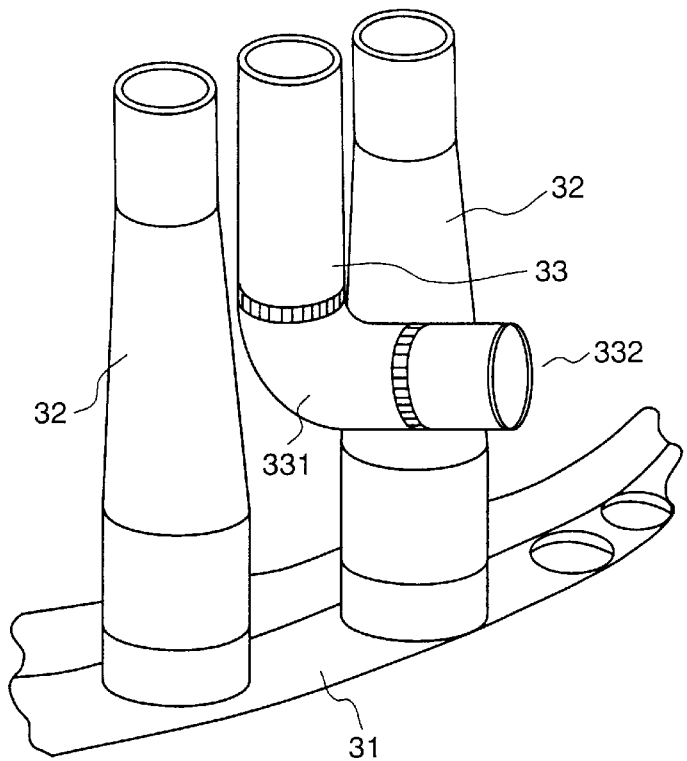
FIG. 6 shows an annulus section and arrangement therein to be subjected to peening operation by the water jet peening apparatus of the invention.

FIG. 6 is a diagram indicating an annulus section, that is, a gap space between the shroud and the pressure vessel, which is a target of the water jet peening using the water jet peeing apparatus of the invention. In the figure, reference number 31 depicts a baffle plate, 32 depicts a jet pump diffuser having a diameter of approximately 500 mm, and 33 depicts a jet pump riser pipe having a diameter of approximately 500 mm.

In the annulus section described above, there are installed baffle plate 31 and jet pump diffuser 32 disposed thereon. Further, in a space between two jet pump diffusers 32, jet pump riser pipe 33 is arranged. These jet pump diffusers 32 and the jet pump riser pipe 33 arranged therebetween constitute a jet pump.

This jet pump having such arrangements described above is interposed in a gap space between the pressure vessel and the shroud wall. A gap between the jet pump and the pressure vessel or the shroud wall is as small as approximately 10 mm.

Figure 7:
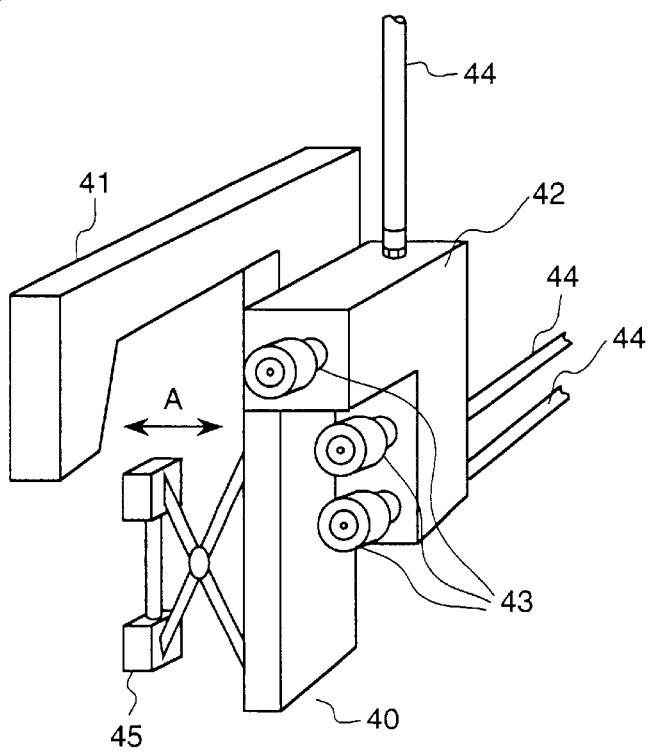
FIG. 7 indicates a water jet peening apparatus for a jet pump riser piping according to the invention.

FIG. 7 is a diagram indicating a water jet peening apparatus for the jet pump riser piping according to the invention.

In this figure, reference number 40 depicts a water jet peening apparatus of the invention, 41 depicts a mount base of the water jet peening apparatus, 42 depicts a nozzle head mounted on mount base 41, 43 depicts a plurality of nozzles attached to nozzle head 42, and 44 depicts a high pressure water supply hose, wherein the high pressure hose is provided in a plural number corresponding to the number of the plurality of nozzles. Further, reference number 45 depicts a clamp, which is allowed to expand and retract in directions of arrow A relative to the mount base, and when expanded it pushes the pressure vessel or the like so as to hold the mount base firmly as will be described more in detail later. Further, the mount base is provided with a leg section, which is not shown here, for receiving a pushing force of the clamp.

Figure 8:
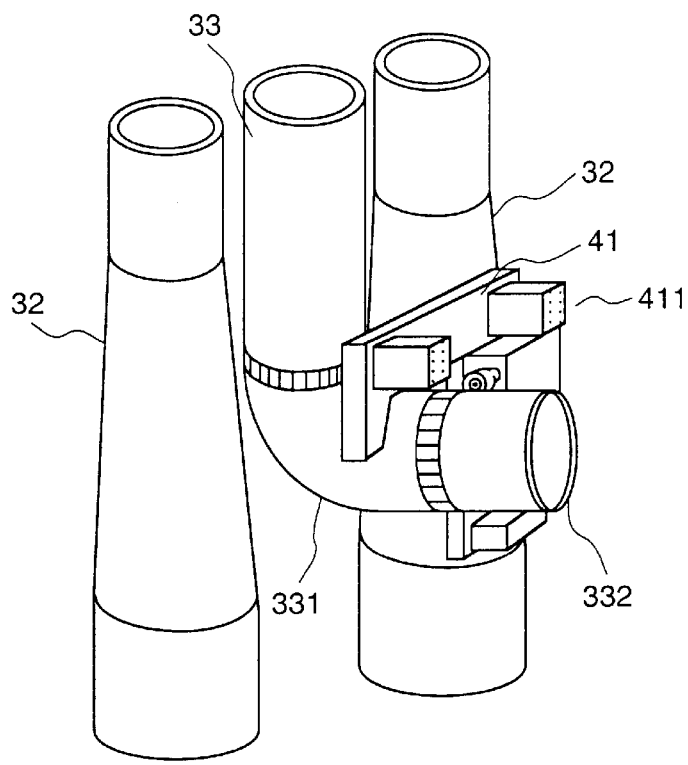
FIG. 8 illustrates an example of application of the water jet peening apparatus as applied to peening of a jet pump riser piping.

FIG. 8 illustrates an example of application of the water jet peening apparatus to the jet pump riser piping according to the invention.

In this figure, reference number 331 depicts an elbow section of jet pump riser piping 33, 332 depicts a pipe on the side of water supply nozzle of the jet pump riser piping, and 411 depicts a leg section for receiving the pushing force of the clamp. The elbow section 332 is welded to the riser piping 33 and to the pipe 332 on the side of the water supply nozzle. By way of example, as the same reference numbers as in FIGS. 6–7 depict the same parts and components, the description thereof will be omitted.

Mount base 41 of water jet peening apparatus 40 is mounted on elbow section 331 of the jet pump riser piping. Then, leg section 411 provided on one surface of the mount base is caused to make contact with an internal wall of the pressure vessel while clamp 45 provided on the opposite surface of the mount base is expanded to push jet pump diffuser 32. Thereby, the water jet peening apparatus is ensured to be firmly fixed in the annulus section.

Figure 9:
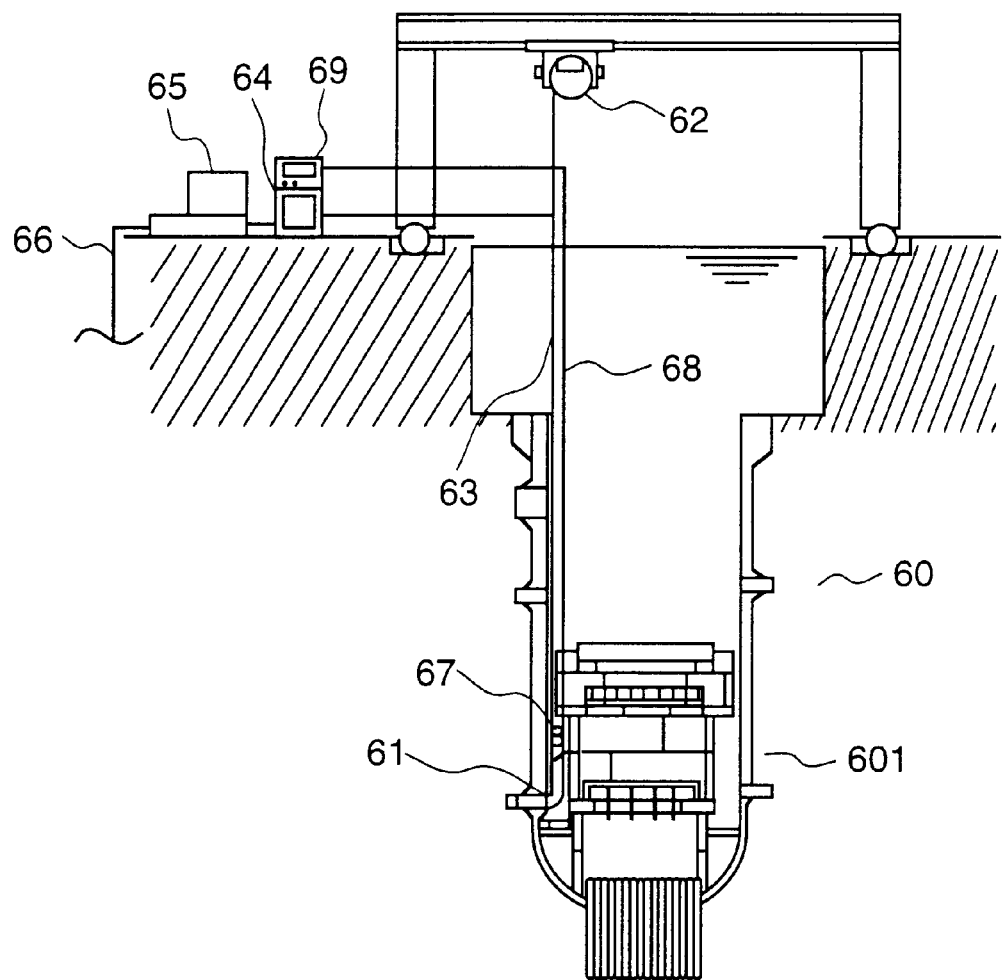
FIG. 9 shows a schematic configuration of a general arrangement for operation of the water jet peening apparatus of the invention.

FIG. 9 is a schematic diagram indicating a general configuration of a peening work system using the water jet peening apparatus of the invention.

In this figure, reference number 60 depicts a reactor, 601 depicts a reactor pressure vessel, 61 depicts a water jet peening apparatus, 62 depicts an auxiliary hoist for a fuel exchanger, 63 depicts a high pressure hose for supplying a high pressure water to the nozzles of the water jet peening apparatus, 64 depicts a control panel of the water jet peening apparatus, 65 depicts a high pressure pump for supplying a high pressure water, and 66 depicts a water supply hose for supplying water from a water supply source to the high pressure pump. Further, 67 depicts a monitor camera for monitoring status of installment of the apparatus and associated components as well as progress of work. 68 depicts a signal cable, 69 depicts a monitor wherein the monitor camera 67 is connected to monitor 69 via the signal cable.

When applying a water jet peening work, water jet peening apparatus 61 is descended by auxiliary host 62 to a position of the jet pump riser piping which is subject to water jet peening work and placed in the gap space between the pressure vessel and the shroud. Then, by confirming a position of installation of equipment with the monitoring camera, the clamp is extended such that the water jet peening apparatus is firmly fixed in the gap space between the shroud's external wall and the pressure vessel. Subsequently, a direction of injection of the nozzles of the water jet peening apparatus, and a length between the nozzles thereof and the weldment of the elbow section are confirmed by the monitoring camera. Then, a water jet is injected at the weldment thereof. By going through these steps of work procedures, peening work on the weldment and in the vicinity thereof can be accomplished.

Now, a third embodiment of the invention will be described with reference to FIGS. 10 to 13 in the following.

Figure 10:
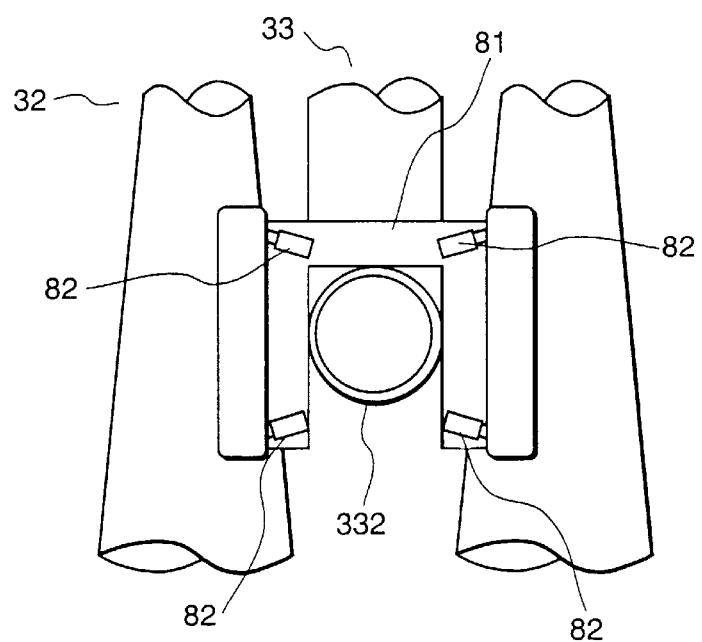
FIG. 10 illustrates an arrangement of a water jet peening apparatus with plural nozzles mounted on its mount base.

FIG. 10 is a diagram indicating a water jet peening apparatus according to a third embodiment of the invention which is applied to peening of the jet pump riser piping, wherein its nozzle is mounted on its mount base such that its water jet is injected at a low angle relative to its cylindrical structure. In this figure, reference number 81 depicts a mount base which is shaped into Π, and which is fixed firmly on elbow section 331 of jet pump riser pipe 33. Each reference number 82 indicates a nozzle which is fixed at each corner of mount base 81. By way of example, because that the same reference numbers as those indicated in FIG. 6 refer to the same components and parts, the description thereof will be omitted.

Each nozzle is mounted such that its angle of injection becomes a low angle with respect to the elbow section 331 of jet pump riser piping 33 subject to peening work. Although not indicated in the figure, the mount base is firmly fixed by a clamp in the gap space between the shroud and the pressure vessel in the same manner described above.

Figure 11:
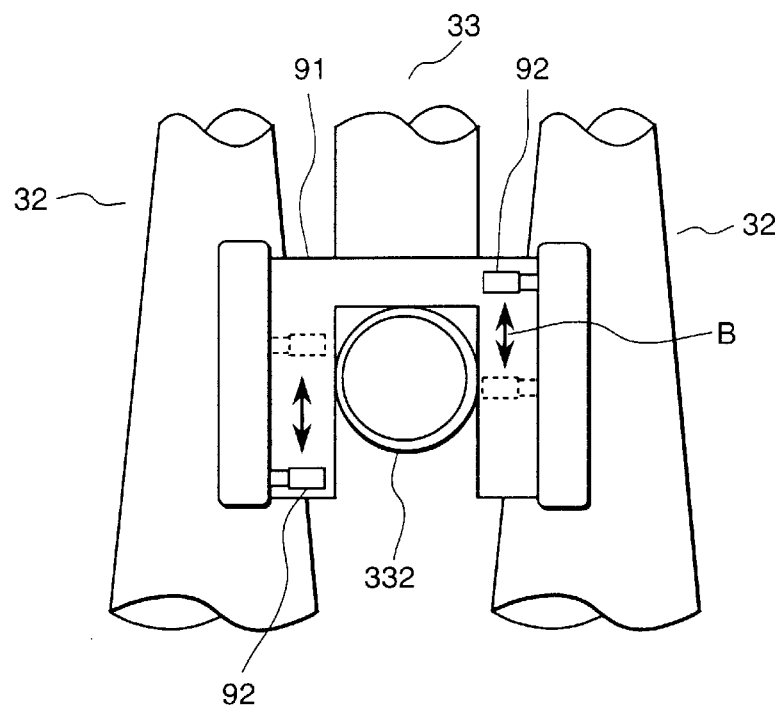
FIG. 11 illustrates another arrangement of a water jet peening apparatus with two nozzles mounted on its mount base.

FIG. 11 is a diagram indicating another example of water jet peening apparatus for applying peening work to the jet pump riser piping according to the invention wherein its nozzle is mounted on its mount base such that its water jet is injected at a low angle with respect to the cylindrical structure. In this figure, reference number 91 depicts its mount base which is shaped into Π, and which is mounted firmly on the elbow section 331 of jet pump riser piping 33. Reference number 92 depicts each nozzle which is provided on both sides of mount base 91, which is movable in directions of arrow B. By the way, the same reference numbers as in FIG. 8 depict the same components and parts described therein, therefore, description thereof will be omitted.

According to this embodiment of the invention, nozzle 92 can move in the directions of arrow B with its direction of injection maintained constant, thereby enabling to apply water jet peening work to the weldment formed on elbow section 331.

Figure 12:
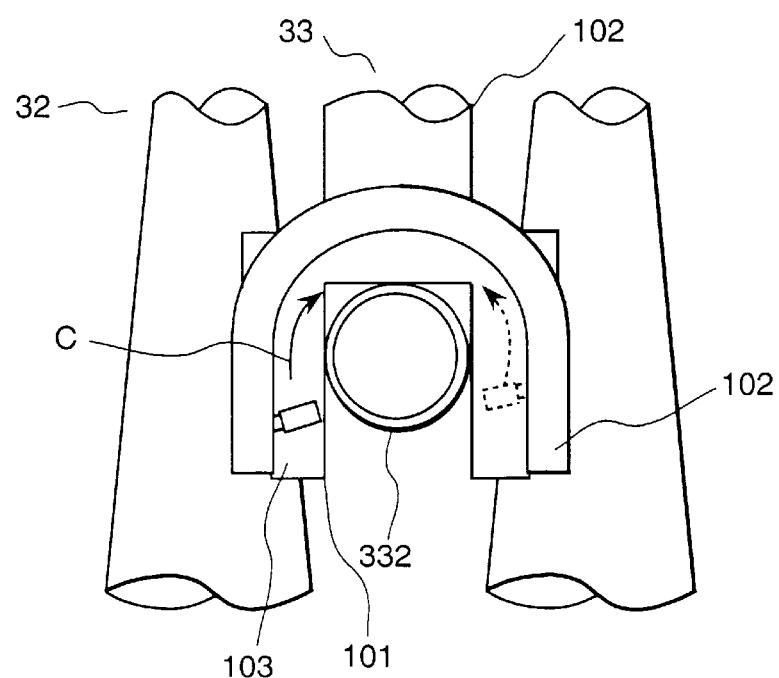
FIG. 12 illustrates still another arrangement of a water jet peening apparatus with two nozzles mounted on its mount base.

FIG. 12 is a diagram indicating still another example of the water jet peening apparatus for applying water jet peening work to the jet pump riser piping wherein its nozzle is mounted on its mount base such that its water jet is injected at a low angle with respect to the cylindrical structure. Reference number 101 depicts its mount base which is shaped into a pattern of Π. 102 depicts a rail formed into a pattern of U which is fixed on the mount base 101. The mount base 101 is firmly mounted on elbow section 331 of jet pump riser pipe 33. Reference number 103 depicts a nozzle which is mounted on the rail having U pattern movably in directions of arrow C. By the way, because the same reference numbers as in FIG. 8 depict the same components and parts, description thereof will be omitted.

Nozzle 103 is allowed to move in the directions of arrow C in such a state that its direction of injection is maintained at a low angle with respect to the elbow section, thereby applying water jet peening work to the weldment formed in elbow section 331.

Figure 13:
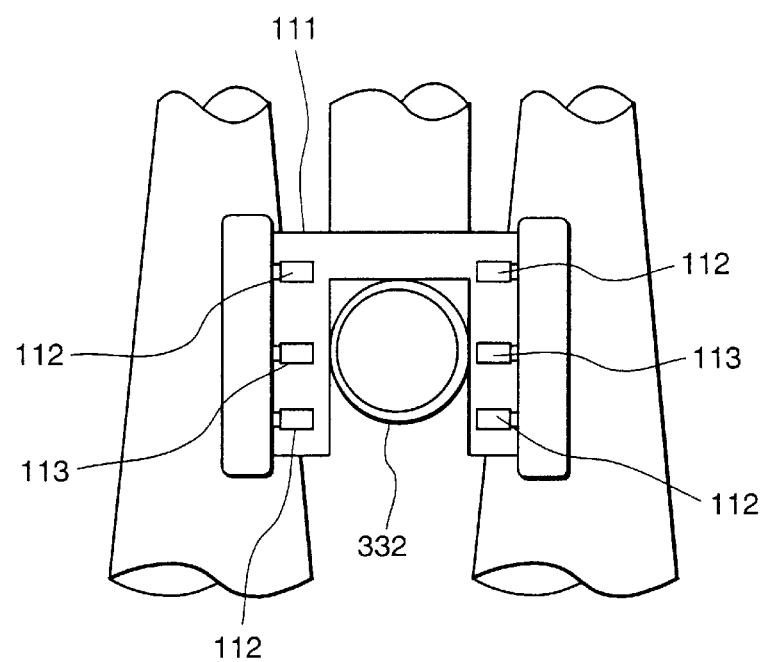
FIG. 13 shows still more another arrangement of a water jet peening apparatus with a plurality of nozzles mounted on its mount base.

With reference to FIG. 13, still another example of a water jet peening apparatus for applying water jet peening work to the jet pump riser piping according to the invention is described wherein a nozzle for injecting a water jet at a low angle and another one for injecting a water jet at a high angle with respect to the cylindrical structure are mounted on its mount base. In this figure, reference number 111 depicts its mount base which is patterned into character Π, which is mounted on elbow section 331 of jet pump riser piping 33. Reference number 112 depicts each nozzle which is mounted at four corners of mount base 81, while 113 depicts each nozzle which is mounted approximately at the center of the mount base. Nozzles 112 and 113 are mounted in parallel arrangements, respectively. By the way as the same reference numbers depict the same components and parts as shown in FIG. 6, the description thereof is omitted. Further, although it is not shown, the mount base is firmly fixed in the gap space between the shroud and the pressure vessel in the same manner described above.

Nozzles 112 positioned at ends of the mount base on both sides thereof can be mounted such that its angle of injection becomes a low angle with respect to elbow arm 331 of jet pump riser piping 33 which is a target of peening work. On the other hand, nozzles 113 positioned in the center are mounted such that its angle of injection becomes perpendicular to the elbow arm of the riser piping. However, because of provision of this combination of the low angle injection and the high angle injection according to the invention, a drop of efficiency in its peening work becomes least compared to a vertical injection alone.

Now, a fourth embodiment of the invention will be described with reference to FIGS. 14 to 16 in the following.

Figure 14:
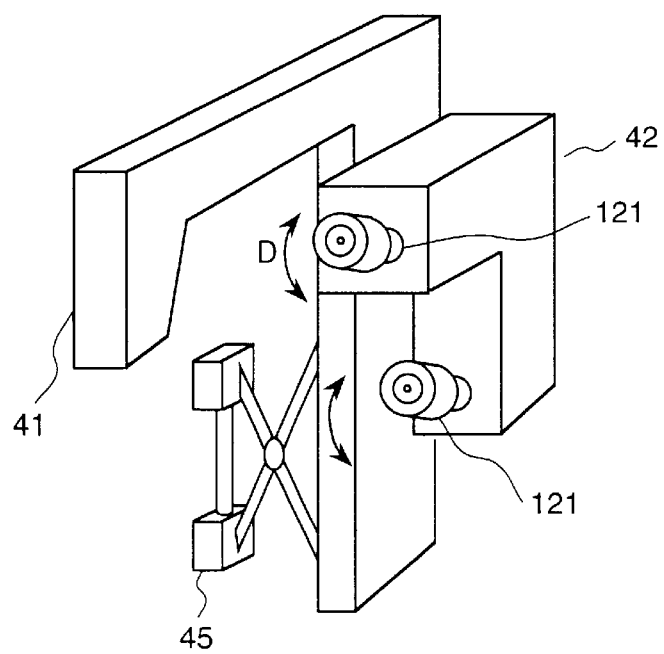
FIG. 14 indicates a water jet peening apparatus provided with a swivel mechanism.

FIG. 14 is a schematic diagram indicating a water jet peening apparatus of the invention wherein its nozzle mounted on a nozzle head is provided with a swivel mechanism which allows for a direction of injection of water jet to change variably. By allowing for the direction of injection of water jet from nozzle 121 to swivel in directions of arrow D, it becomes possible evenly to apply peening work over the whole area of an external surface of the cylindrical structure. Further, the number of nozzles can be decreased advantageously compared to a fixed type nozzle head having a plurality of nozzles firmly fixed thereto. Still further, setup positions of its nozzle may be less precise compared to the fixed type nozzles.

Figure 15A:
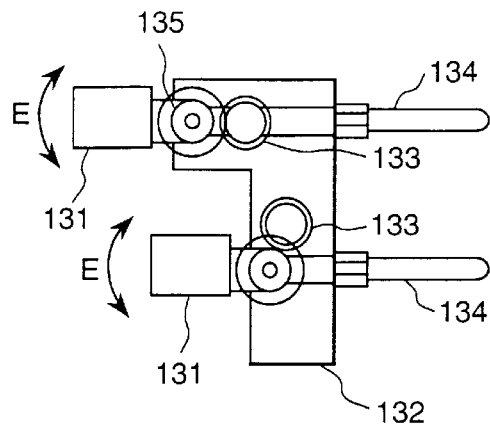
FIGS. 15A and 15B indicate a mechanism for swiveling the nozzle.
Figure 15B:
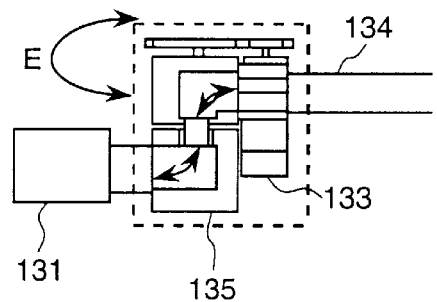

FIGS. 15(A) and 15(B) indicate its nozzle swivel mechanism, wherein FIG. 15(A) is a plan view of the nozzle swivel mechanism, and FIG. 15(B) is a side view thereof.

Reference number 131 depicts its nozzle, 132 depicts a nozzle head, and 133 depicts an electric motive actuator for swiveling nozzle 131 in directions of arrow E, wherein the actuator 133 is housed within nozzle head 132. Further, reference number 135 depicts a swivel joint, which can supply a high pressure water from high pressure hose 134 continuously without interruption to the nozzle while it is swiveled. By way of example, the nozzle may be swiveled manually from outside by means of mechanical gears or the like instead of the electric motive actuator.

Figure 16:
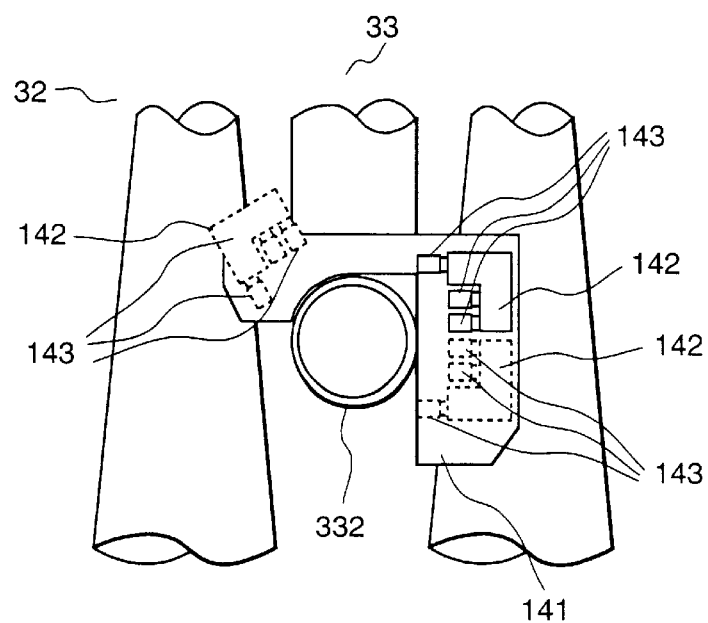
FIG. 16 indicates a water jet peening apparatus of the invention in which the position of mount of its nozzle head is changeable.

FIG. 16 is a diagram indicating a water jet peening apparatus of the invention wherein setting position of the nozzle head which is mounted on the mount base is changeable.

In this figure, reference number 141 depicts its mount base, and 142 depicts its nozzle attached to the nozzle head. Nozzle head 142 is mounted removal from mount base 141, for example which can be removed from its initial position indicated by a solid line on the mount base and reset at a position indicated by dotted lines.

For use of the water jet peening apparatus in the reactor, a simple and light-weight structure is more preferred in consideration of operability and reliability. Therefore, it is preferable to prepare plural types of nozzle heads having a minimum necessary number of nozzles 143, select ones therefrom most appropriate for work conditions, and mount it on the mount base thereof.

By this means of exchanging the plural types of nozzle heads, it can eliminate a more complex mechanism and necessity to provide additional/redundant nozzles, thereby enabling to provide the water jet peening apparatus at a reduced cost of manufacture.

Now, a fifth embodiment of the invention will be described with reference to FIG. 17 in the following.

Figure 17:
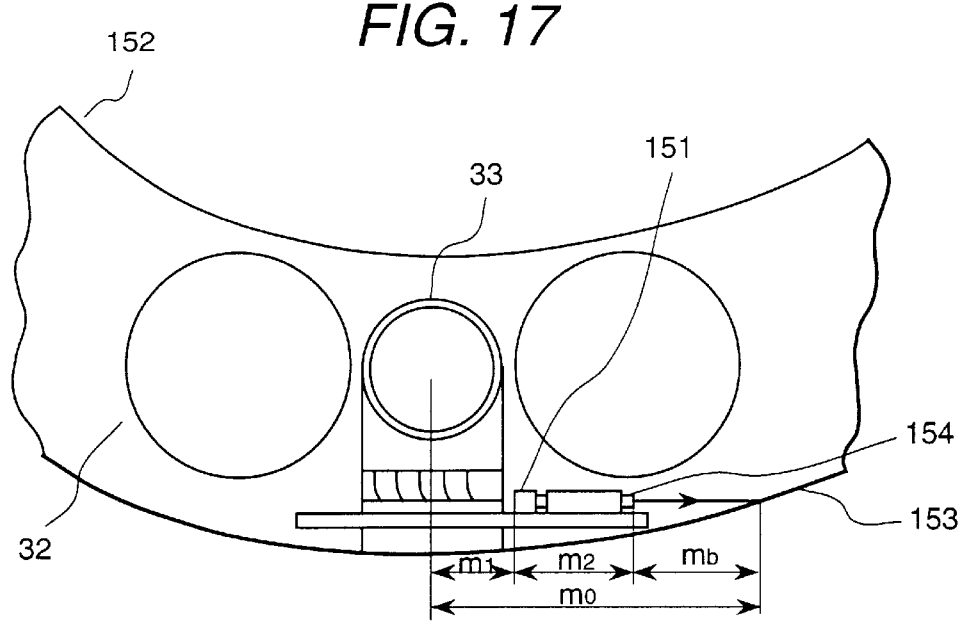
FIG. 17 illustrates a method for determining a position of installment of the nozzle using a distance sensor of the invention.

FIG. 17 is a diagram indicating a method of determining a positioning of the nozzle using a position sensor according to the invention, wherein reference number 151 depicts nozzle, 152 depicts shroud, 153 depicts pressure vessel, and 154 depicts distance sensor which is attached in the vicinity of nozzle 151. By the way, because the same reference numbers indicate the same components and parts described in FIG. 6, description thereof will be omitted.

Distance sensor 154 is fixed in the rear side of nozzle 151 because it may become difficult to measure a distance when it is placed in front of the nozzle due to the influence of a jet stream. As indicated in FIG. 17, sensor 154 measures a distance to the wall of pressure vessel 153. Assuming that a distance between a center of elbow arm 331 of riser piping 33 which is a target of peening work and the wall of pressure vessel 154 in the rear side of the nozzle is m0; a distance between a front end of nozzle 151 and a front end of sensor 154 is m2; and a distance between the front end of sensor 154 and the wall of pressure vessel 153 which was measured by the sensor is mb, then a distance mf between the front end of the nozzle and the center of the riser piping can be expressed by the following equation, $$Mf=m0-m2-mb.$$

Now, a sixth embodiment of the invention will be described with reference to FIG. 18 in the following.

FIG. 18 is a flowchart indicating sequential steps of application of the water jet peening apparatus to the jet pump riser piping.

At first, instep S1, a cover of the reactor pressure vessel, steam dryer and a shroud head are removed.

Then, instep S2, in-reactor structures are removed, and if necessary, an inlet-mixer is also removed.

In step S3, presence of any obstacles, which may interfere access to and set-up of the water jet peening apparatus at the elbow arm of the jet pump riser piping, and also location of weldments thereof are confirmed while descending the monitor camera.

In step S4, a control panel and a high pressure pump are set up on the work floor, the pressure pump is connected to a water supply tank with a water hose, and the pressure pump is connected to the water jet peening apparatus with a high pressure hose. Further, wiring cables are laid out between these equipment, and they are adjusted.

Next, in step S5, the water jet peening apparatus is set up in the following procedures. At first, the water jet peening apparatus is descended using a fuel exchange auxiliary hoist near to the elbow arm of the jet pump riser piping between the shroud and the pressure vessel, and its horizontal position and posture is confirmed using the monitor camera. Then, the water jet peening apparatus is firmly fixed between the shroud and the pressure vessel. Subsequently, a distance between a weld line on the elbow arm of the jet pump riser piping which is the target of peening work and the nozzle of the water jet peening apparatus as well as a direction of the nozzle are confirmed and verified using the monitor camera. Then by injecting a test water jet, it is confirmed if its water jet hits a predetermined point on the elbow arm of the jet pump riser piping. Also, both positions of peening work and the nozzle are adjusted appropriately using the distance sensor provided on the water jet peening apparatus.

Further, in step S6, water jet peening work is executed in the following procedures. At first, an injection pressure of the nozzle, an injection flow rate, a travel speed of the nozzle and a travel range thereof are set up. Then, after verification by a test water jet injection, a water jet peening work is executed for a predetermined period of time using the nozzle which scans along the periphery of the elbow arm of the jet pump riser piping, or using fixed nozzles. Status of peening work is monitored any time using the monitoring camera, and completion of peening work is verified using the camera.

Then, in step S7, the apparatus is withdrawn in the following sequences. At first, the clamp, which firmly has fixed the water jet peening apparatus between the shroud and the pressure vessel, is released. Then, it is confirmed by the monitoring camera if the water jet peening apparatus is ready to be lifted up. If ready, the water jet peening apparatus is lifted using the auxiliary hoist.

In step S8, the water supply hose and the high pressure water hose are disconnected and removed to disengage connections between the pressure pump and the water supply tank and between the pressure pump and the water jet peening apparatus. Also, wiring connections between these equipment are removed, and the equipment and apparatus are withdrawn.

Further, in step S9, the inlet mixer is restored in case the same has been disassembled in step 2.

In step S10, the monitoring camera is withdrawn.

Then, in step S11, the steam dryer, the cover of the reactor pressure vessel and the shroud head are lifted for reassembling and restored.

Now, a seventh embodiment of the invention will be described with reference to FIGS. 19–20.

Figure 19:
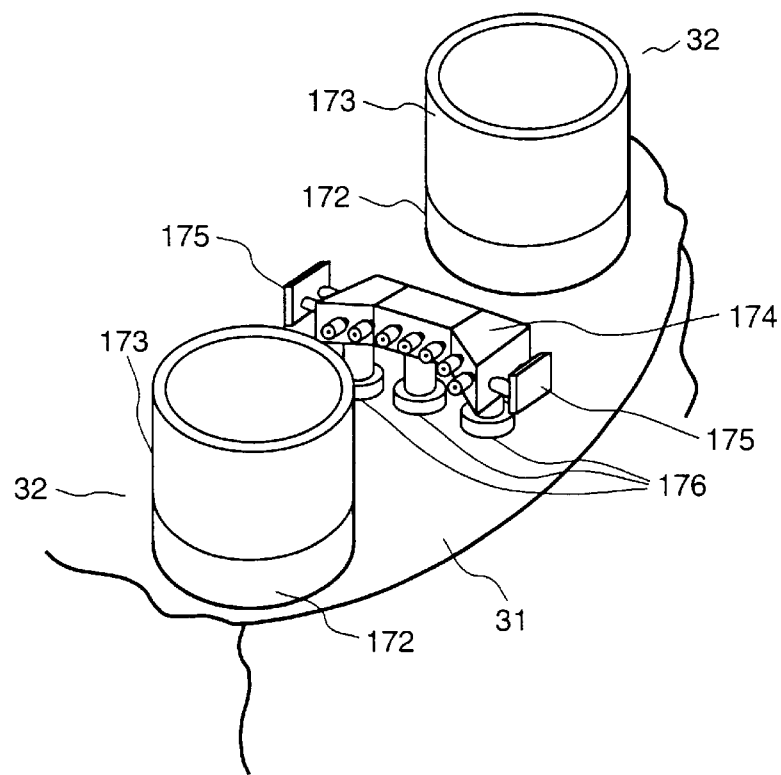
FIG. 19 is a diagram indicative of a water jet peening apparatus for the jet pump diffuser.

FIG. 19 is a diagram indicating a water jet peening apparatus in use for the jet pump diffuser according to the invention. In this figure, reference number 172 depicts a lower ring which constitutes jet pump diffuser 32, which lower ring 172 is welded to baffle plate 31. Further, reference number 173 depicts a tail pipe which constitutes the jet pump diffuser, and which tail pipe 173 is connected to lower ring 172. Weldments provided at these two different positions are a target of peening work using the water jet peening apparatus of the invention. Further, reference numbers 174 depicts its water jet peening apparatus of use for the jet pump diffuser, 175 depicts its clamp, and 176 depicts a stay for adjusting a height of water jet peening apparatus 174.

Water jet peening apparatus 174 is mounted on the baffle plate, and a height of the apparatus is adjusted by stay 176 such that a center of water jet coincides with a height of weldment. Then, clamps 175 attached to both sides of the apparatus are expanded to firmly hold the water jet peening apparatus between the pressure vessel and the shroud before executing water jet peening work. A plurality of nozzles having a low injection angle and a high injection angle relative to the surface of weldments are provided, and these nozzles having different directions of injection are used in combination such that the water jet peening work is done evenly over the whole periphery of weldment.

Figure 20:
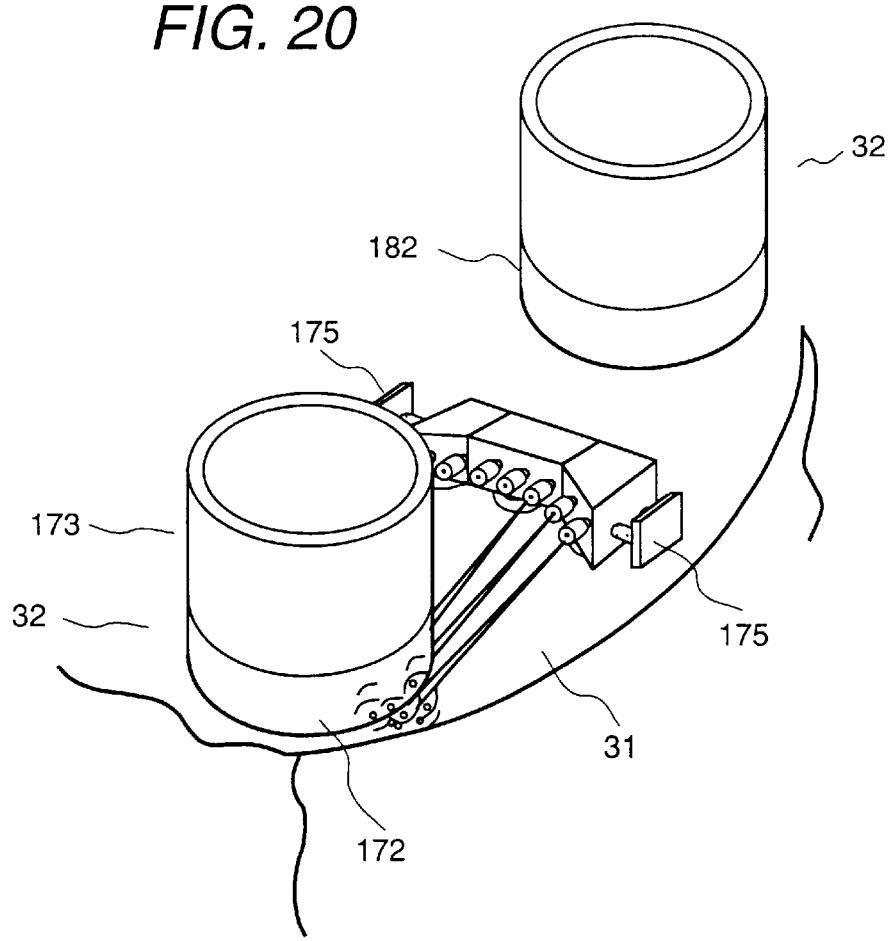
FIG. 20 shows an example of water jet peening operations for applying peening work to weldments between a baffle plate and a lower ring of a diffuser.

FIG. 20 is a diagram showing an example of water jet peening work according to the invention wherein weldments between baffle plate 31 and lower ring 32 of the jet pump diffuser as well as between the lower ring and the tail pipe thereof are under peening work.

Figure 21:
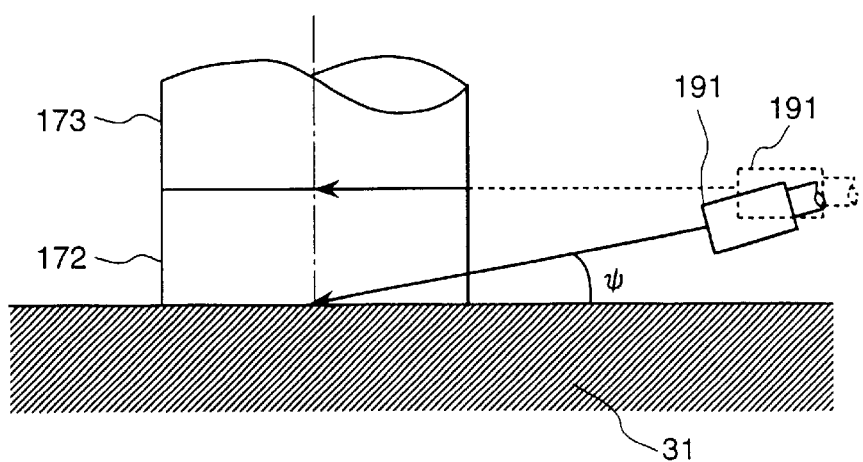
FIG. 21 indicates an angle of swivel of the water jet peening apparatus of the invention.

FIG. 21 is a diagram indicating a swivel angle of the water jet peening apparatus of the invention.

In this figure, reference number 191 depicts its nozzle provided with the swivel mechanism, and symbol $\psi$ depicts angle of injection. By the way, the same reference numbers as in FIG. 17 depict the same components and parts, therefore description thereof will be omitted here.

Water jet peening apparatus 174 is mounted on the baffle plate, and clamps 175 provided on both sides of the apparatus are expanded firmly to hold the apparatus between the pressure vessel and the shroud, then water peening work is conducted. Nozzle 191 of the water jet peening apparatus is provided with the swivel mechanism which can vary the direction of its injection to allow for peening work to be applied on both weldments between baffle plate 32 and lower ring 172 as well as between lower ring 172 and tail pipe 173. In this figure, angle $\psi$ between the direction of injection from the nozzle and the baffle plate is preferably in a range from 0 to 45 degrees.

Figure 22:
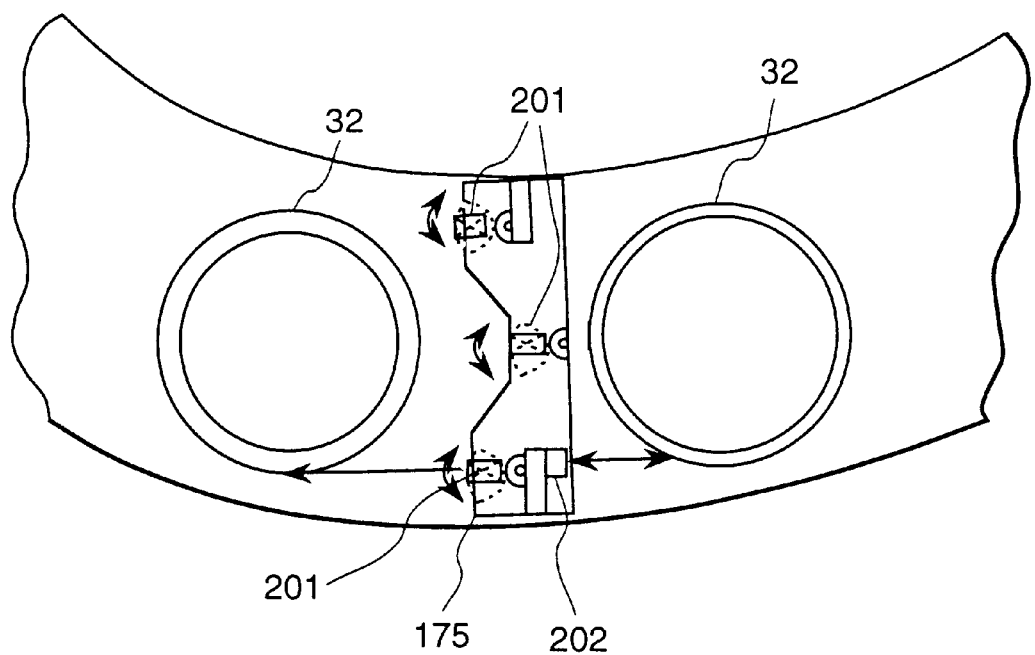
FIG. 22 is a diagram indicative of a swivel mechanism of the nozzle.

FIG. 22 is a diagram indicating the swivel mechanism of the nozzle.

In this figure, reference number 201 depicts the nozzle, and 202 depicts a distance sensor attached in the rear side thereof. By the way, the same reference numbers as in FIGS. 19–21 depict the same components and parts therein, therefore, description thereof will be omitted.

The reason for placing the distance sensor in the backward of the nozzle is because that measurement of a distance may become difficult if placed in front of the nozzle depending on a type of sensors which may be affected by the water jet stream. As indicated in this figure, sensor 202 detects a length to diffuser 32, which is located in the backward of the nozzle. As to a length between a center line of another diffuser 32 subject to peening work in front of the nozzle and the nozzle tip, it is detected in the same manner as described with respect to the riser piping with reference to FIG. 15.

Now, with reference to FIG. 23, an eighth embodiment of the invention will be described in the following.

FIG. 23 is a flowchart indicating steps in sequence of applying the water jet peening apparatus to the peening work of the jet pump diffuser.

First, in step S1, the top cover of the reactor pressure vessel, steam dryer and the shroud head are removed.

Then, in step S2, in-reactor structures are removed, and if necessary, the inlet mixer is also removed.

In step S3, while descending the monitoring camera, presence of obstacles which interfere access of the water jet peening apparatus to the jet pump diffuser section is monitored and avoided, then weld lines of the diffuser are confirmed by the monitor.

Next, in step S4, a control panel and a pressure pump are disposed on the work floor, the pressure pump and a water resource tank are connected using a water hose, then the pressure tank and the water jet peening apparatus are connected using a high pressure hose. Further, wiring cables are laid out between these equipment, and coordinated therebetween.

Then, in step S5, the water jet peening apparatus is installed in the following procedures. At first, lifting the water jet peening apparatus using the fuel exchanger auxiliary hoist, it is descended above the baffle plate between the shroud and the pressure vessel and in a space between the jet pump diffusers. Then, its position for set-up is determined by the monitor camera. Subsequently, the water jet peening apparatus is firmly fixed between the shroud and the pressure vessel in the manner described above. Then, the monitoring camera is used to confirm and verify a distance from the nozzle to the weld lines between the lower ring and the baffle plate as well as between the lower ring and the tail pipe, and also whether or not the direction of the nozzle is appropriate. Then, a test water jet is injected to see if its jet stream hits a predetermined position on the diffuser. Further, using the distance sensor provided on the water jet peening apparatus, the set-up position of the apparatus and the nozzle position are adjusted appropriately.

Subsequently, in step S6, its water peening work is carried out in the following procedures. At first, an injection pressure of the nozzle, injection flow rate, travel speed of the nozzle, and a range of travel thereof are determined. Further, in the case where the fixed nozzles are used, a period of time for injection is also determined. In the next, a test water jet is injected to see if it works appropriately. Then, the water jet peening work is carried out by causing the nozzle to scan around the periphery of the elbow arm of the jet pump riser piping, or in case of the fixed nozzle type, by applying water jet peening work for a predetermined period of time. Work conditions and progress are monitored any time using the monitoring camera. After peening work, its completion is confirmed and verified through the monitor camera.

Now, in step S7, the water jet peening apparatus is moved upward in order to apply peening work to the weldment between the lower ring and the tail pipe in the following steps. At first, the clamp, which firmly holds the water jet peening apparatus between the shroud and the pressure vessel, is released (1). Then, if it is ready for the water jet peening apparatus to be lifted is verified through the monitoring camera (2). The water jet peening apparatus is, then, lifted by the auxiliary hoist to move to a predetermined position (3). A set-up position after its transfer is verified through the monitoring camera (4). The water jet peening apparatus is firmly fixed between the shroud and the pressure vessel (5). Then, water jet peening work is carried out over the weldment between the lower ring and the tail pipe in the same manner as done in step S6 (6).

Further, in step S8, the apparatus is withdrawn in the following procedures. At first, the clamp, which is used to firmly hold the water jet peening apparatus between the shroud and the pressure vessel, is released. Then, through the monitoring camera, it is verified if lifting of the water jet peening apparatus is ready or not. If verified lifting is ready, the water jet peening apparatus is lifted using the auxiliary hoist for its withdrawal.

Next, in step S9, the water hose and the high pressure hose are disconnected and removed to release the coupling between the pressure pump and the water tank as well as between the pressure pump and the water jet peening apparatus. Further the wiring cables connecting between the equipment are also removed, and the apparatus and components are withdrawn.

In step S10, if the inlet mixer has been removed in step S2, it is reassembled.

In step S11, the monitoring camera is removed and withdrawn.

Finally, in step S12, the steam dryer, the cover of the reactor pressure vessel and the shroud head are lifted, reassembled and restored.

In the case when these steps of procedures are to be followed during routine testing period of the power generation plant, because the top mirror cover plate of the pressure vessel, the steam dryer and the shroud head are already removed, its water jet peening work starts from step S2 and ends at step S11.

In the description of the invention heretofore, the liquid for use in the peening apparatus has been described by way of example of water, however, it is not limited thereto, and any liquid other than water may be used as well.

What is claimed is:

1. A water jet peening apparatus comprising:
   a mount base having a nozzle head mounted thereon and being mounted on an elbow section of a jet pump riser pipe; and
   at least one holding member for holding said mount base, wherein said nozzle head has at least three nozzles which are arranged in the vertical direction at one side of said mount base, each nozzle being supplied with high pressure water for producing a jet flow, said jet flow containing air bubbles generated by cavitation for performing peening work on a surface of said jet pump riser pipe.

2. A water jet peening apparatus according to claim 1, wherein said at least three nozzles are provided at both sides of the elbow section of said jet pump riser pipe.

3. A water jet peening apparatus according to claim 2, wherein the nozzles at the top and bottom positions are attached so that an injection angle of jet flow injected from each nozzles, which is defined as an angle between a tangential direction at the point of said elbow portion, at which the center flow in said jet flow strikes, and the direction of the central flow in each jet flow, is a small angle to said elbow portion of said jet pump riser, to which peening work is performed.

4. A water jet peening apparatus according to claim 2, wherein each nozzle has a swing mechanism by which the nozzle swings in the vertical direction.

5. A water jet peening apparatus according to claim 2, wherein said holding member includes a support leg member, which is provided at one side of said mount base, contacting an inner wall of a pressure vessel, and a retractile clamp which is provided on another side of said mount base.

6. A water jet peening apparatus according to claim 2, wherein a ratio of an injection distance from each nozzle to said jet pump riser pipe to the diameter of an injection hole of said nozzle is in a range of 75–150.

7. A water jet peening apparatus according to claim 2, wherein the nozzles at the right and left positions are attached so that an injection angle of jet flow injected from each nozzle, which is defined as an angle between a tangential direction at the point in said diffuser, at which the center flow in said jet flow strikes, and the direction of the central flow in each jet flow, is a small angle to said elbow portion of said jet pump diffuser, to which peening work is performed.

8. A water jet peening apparatus according to claim 1, wherein the nozzles at top and bottom positions are attached so that an injection angle of jet flow injected from these nozzles, defined as an angle between a tangential direction at the point of said elbow portion, at which the center flow in said jet flow strikes, and the direction of the central flow in each jet flow, is a small angle to said elbow portion of said jet pump riser, to which peening work is performed.

9. A water jet peening apparatus according to claim 8, wherein said injection angle of said jet flow injected from said nozzles is smaller than 45 degrees.

10. A water jet peening apparatus according to claim 8, wherein said injection angle of said jet flow injected from said nozzles is smaller than 15 degrees.

11. A water jet peening apparatus according to claim 1, wherein each nozzle has a swing mechanism by which the nozzle swings in the vertical direction.

12. A water jet peening apparatus according to claim 1, wherein said holding member includes a support leg member, which is provided at one side of said mount base, contacting an inner wall of a pressure vessel, and a retractile clamp which is provided on another side of said mount base.

13. A water jet peening apparatus according to claim 1, wherein a ratio of an injection distance from each nozzle to said jet pump riser pipe to the diameter of an injection hole of said nozzle is in a range of 75–150.

14. A water jet peening apparatus according to claim 1, wherein the nozzles at the right and left positions are attached so that an injection angle of jet flow injected from each nozzles, which is defined as an angle between a tangential direction at the point in said diffuser, at which the center flow in said jet flow strikes, and the direction of the central flow in each jet flow, is a small angle to said elbow portion of said jet pump diffuser, to which peening work is performed.

15. A water jet peening apparatus according to claim 14, wherein said injection angle of said jet flow injected from said nozzles is smaller than 45 degrees.

16. A water jet peening apparatus according to claim 14, wherein said injection angle of said jet flow injected from said nozzles is smaller than 15 degrees.

17. A water jet peening apparatus comprising:

a main body, on which a plurality of nozzles are mounted, mounted on a baffle plate;

at least an adjusting member for adjusting a height of said main body;

wherein said main body having at least three nozzles which are arranged in the horizontal direction at one side of said mount body, each nozzle being supplied with a high pressure water for producing a jet flow in water, and said jet flow contains air bubbles generated by cavitation for performing peening work to a surface of a jet pump diffuser.

18. A water jet peening apparatus according to claim 17, wherein each nozzle has a swing mechanism by which the nozzle swings in the vertical direction.

19. A water jet peening apparatus according to claim 17, wherein each nozzle has a swing mechanism by which the nozzle swings in the horizontal direction.

20. A water jet peening apparatus according to claim 17, wherein said holding member has two clamps at the side of a pressure vessel and the side of a shroud, respectively, and said main body is supported between said pressure vessel and shroud, at any height level, by said two clamps.

21. A water jet peening apparatus according to claim 17, wherein a ratio of an injection distance from each nozzle to said pump diffuser to the diameter of an injection hole of said nozzle is in a range of 75–150.

\* \* \* \* \*